(12) United States Patent
Bhattacharya et al.

(10) Patent No.: US 9,898,862 B2
(45) Date of Patent: Feb. 20, 2018

(54) SYSTEM AND METHOD FOR MODELING BUILDINGS AND BUILDING PRODUCTS

(75) Inventors: Daipayan Bhattacharya, Santa Monica, CA (US); Edwin Hathaway, Santa Monica, CA (US); Tony Cholfe, Innisfil (CA); Daniel Frank, North Vancouver (CA)

(73) Assignee: Oldcastle BuildingEnvelope, Inc., Plano, TX (US)

( * ) Notice: Subject to any disclaimer, the term of this patent is extended or adjusted under 35 U.S.C. 154(b) by 0 days.

(21) Appl. No.: 13/421,624

(22) Filed: Mar. 15, 2012

(65) Prior Publication Data

US 2012/0249539 A1    Oct. 4, 2012

Related U.S. Application Data

(60) Provisional application No. 61/453,262, filed on Mar. 16, 2011.

(51) Int. Cl.
*G06T 15/00* (2011.01)
*G06T 19/00* (2011.01)

(52) U.S. Cl.
CPC ........ *G06T 19/003* (2013.01); *G06T 2210/04* (2013.01)

(58) Field of Classification Search
None
See application file for complete search history.

(56) References Cited

U.S. PATENT DOCUMENTS

| | | | |
|---|---|---|---|
| 6,134,511 A | 10/2000 | Subbarao | |
| 6,300,960 B1 | 10/2001 | DeRose et al. | |
| 6,446,053 B1 | 9/2002 | Elliott | |
| 6,476,803 B1 | 11/2002 | Zhang et al. | |

(Continued)

FOREIGN PATENT DOCUMENTS

| | | |
|---|---|---|
| CN | 101581126 A | 11/2009 |
| JP | 6214973 A | 8/1994 |

(Continued)

OTHER PUBLICATIONS

Beckert, Beverly A., "Structural Innovation Takes Shape," Concept to Reality, Spring/Summer 2009, 3 pages.

(Continued)

*Primary Examiner* — Yu Chen
(74) *Attorney, Agent, or Firm* — Winstead PC

(57) ABSTRACT

In one embodiment, a method includes causing a building model for a modeled building to be presented on a client computer. The building model includes a three-dimensional scene. The three-dimensional scene includes an individual rendering of at least selected building components for the modeled building. The method further includes permitting a user of the client computer to perform a virtual walkthrough of the three-dimensional scene. In addition, the method includes receiving a user change to the three-dimensional scene via a graphical user interface (GUI) component. Furthermore, the method includes dynamically changing the building model in accordance with the user change. The dynamically changing includes individually modifying an appearance of at least one building component of the at least selected building components in the three-dimensional scene.

16 Claims, 16 Drawing Sheets

(56) References Cited

U.S. PATENT DOCUMENTS

| | | |
|---|---|---|
| 6,556,211 B2 | 4/2003 | Davis |
| 6,611,267 B2 | 8/2003 | Migdal et al. |
| 6,859,768 B1 | 2/2005 | Wakelam et al. |
| 6,879,884 B2 | 4/2005 | Miyashita et al. |
| 6,912,293 B1 | 6/2005 | Korobkin |
| 6,968,295 B1 | 11/2005 | Carr |
| 7,002,573 B2 | 2/2006 | Trotta et al. |
| 7,126,603 B2 | 10/2006 | Aliaga et al. |
| 7,257,548 B2 | 8/2007 | Hathaway et al. |
| 7,398,481 B2 | 7/2008 | Kraus et al. |
| 7,444,189 B1 | 10/2008 | Marhoefer |
| 7,583,275 B2 | 9/2009 | Neumann et al. |
| 2002/0116239 A1 | 8/2002 | Reinsma et al. |
| 2002/0154174 A1 | 10/2002 | Redlich et al. |
| 2004/0239494 A1 | 12/2004 | Kennedy et al. |
| 2004/0254686 A1 | 12/2004 | Matsui et al. |
| 2005/0081161 A1* | 4/2005 | MacInnes ........... G06F 17/5004 715/765 |
| 2005/0108982 A1 | 5/2005 | Formisano |
| 2005/0140670 A1 | 6/2005 | Wu et al. |
| 2006/0092156 A1 | 5/2006 | Trotta et al. |
| 2006/0241905 A1 | 10/2006 | McCalla |
| 2007/0062143 A1 | 3/2007 | Noushad |
| 2007/0109310 A1 | 5/2007 | Xu et al. |
| 2007/0179759 A1* | 8/2007 | Mangon ............................ 703/1 |
| 2008/0062167 A1* | 3/2008 | Boggs et al. ................ 345/419 |
| 2008/0195405 A1 | 8/2008 | Lopez et al. |
| 2008/0249756 A1* | 10/2008 | Chaisuparasmikul G06F 17/5004 703/13 |
| 2009/0089018 A1 | 4/2009 | Kelley et al. |
| 2009/0128558 A1 | 5/2009 | Morello et al. |
| 2010/0017177 A1 | 1/2010 | Dosunmu |
| 2010/0049488 A1 | 2/2010 | Benitez et al. |
| 2010/0057416 A1 | 3/2010 | Peterman et al. |
| 2010/0110071 A1* | 5/2010 | Elsberg ................. G06T 15/005 345/419 |
| 2012/0086727 A1* | 4/2012 | Korah ................... G06T 19/006 345/633 |

FOREIGN PATENT DOCUMENTS

| | | |
|---|---|---|
| JP | 2006-139504 A | 6/2006 |
| WO | WO-2004068274 A2 | 8/2004 |
| WO | WO-2008064260 A2 | 5/2008 |

OTHER PUBLICATIONS

Laycock, Robert and Stephen, "Featured 3D Method: Haptically Aware Movies. Touching High-Quality Computer-Generated Environments," 3DVisA Bulletin, Issue 2, Mar. 2007, 9 pages.

Tobenkin, David, "Picturing the Future: Entrepreneu 'Realizes' Renderings," Alaska Business Monthly, v 23, n 12, p. 60(4), Dec. 1, 2007, 4 pages.

Crawley, Drury B.,et al., "Contrasting the Capabilities of Building Energy Performance Simulation Programs," United States Department of Energy, University of Strathclyde and University of Wisconsin, Version 1.0, Jul. 2005, 59 pages.

* cited by examiner

| Configuration | Product Description | Nominal Thickness | Visible Light | | | Ultraviolet | Solar | | U-factor / U-Value | | Shading Coefficient | Solar Heat Gain Coefficient | Relative Heat Gain | Light to Solar Gain |
|---|---|---|---|---|---|---|---|---|---|---|---|---|---|---|
| | | | Trans % | Reflectance Outside % | Reflectance Inside % | Trans % | Trans % | Reflectance Outside % | Winter Nighttime | Summer Daytime | | | | |
| IGU | OB: 1/4" Oldcastle BuildingEnvelope™ SunGlass® Low-E #2<br>AS: 1/2" (Air Fill)<br>IB: 1/4" Clear | 0.946 | 50 | 6 | 11 | 4 | 20 | 28 | 0.29 | 0.27 | 0.29 | 0.25 | 61 | 2.00 |
| IGU | OB: 1/4" PPG Solarban® 70 XL Low-E #2<br>AS: 1/2" (Air Fill)<br>IB: 1/4" Clear | 0.946 | 64 | 12 | 13 | 6 | 25 | 52 | 0.28 | 0.26 | 0.32 | 0.27 | 67 | 2.37 |
| IGU | OB: 1/4" PPG Solarban® R100 on Clear Radiant Low-E #2<br>AS: 1/2" (Air Fill)<br>IB: 1/4" Clear | 0.946 | | | | | | | | | | | | .83 |
| IGU | OB: 1/4" Guardian SunGuard® AG 43 on Clear Radiant Low-E #2<br>AS: 1/2" (Air Fill)<br>IB: 1/4" Clear | 0.946 | | | | | | | | | | | | .36 |
| IGU | OB: 1/4" PPG Solarban® R100 on Solarblue™ Radiant Low-E #2<br>AS: 1/2" (Air Fill)<br>IB: 1/4" Clear | 0.946 | | | | | | | | | | | | .37 |
| IGU | OB: 1/4" PPG Solarban® R100 on Clear Radiant Low-E #2<br>AS: 1/2" (90% Argon Fill)<br>IB: 1/4" Clear | 0.946 | | | | | | | | | | | | .83 |

FIG. 3B

SYSTEM AND METHOD FOR MODELING BUILDINGS AND BUILDING PRODUCTS

CROSS-REFERENCE TO RELATED APPLICATIONS

This application claims priority from, and incorporates by reference the entire disclosure of, U.S. Provisional Application No. 61/453,262 filed on Mar. 16, 2011. This application also incorporates by reference U.S. Pat. No. 7,257,548.

BACKGROUND

Technical Field

The present invention relates generally to building-information modeling (BIM) and more particularly, but not by way of limitation, to systems and methods for modeling, visualizing, analyzing, and interacting with digital models of buildings and building products.

History of Related Art

Building information modeling (BIM) is generally a process of generating and managing building data for a building such as, for example, an office tower. BIM may include use of three-dimensional modeling software that takes into account, for example, building geometry, spatial relationships, and quantities and specification properties of various building components. BIM may involve modeling, for example, product norms of the various building components. The product norms may be extracted, for example, from specifications.

One advantage of BIM is that it typically results in increased information sharing among architects, engineers, contractors, and customers. Consequently, BIM encourages more frequent and more effective interaction among stakeholders in a building-construction process. As BIM becomes more prevalent, architects, engineers, contractors, and customers increasingly desire more robust BIM solutions that enable, for example, real-time, accurate modeling and the potential to develop analytical insights about the performance of a building before building construction begins.

Particular difficulties are associated with modeling, for example, a building envelope. The building envelope typically includes, for example, a foundation, roof, walls, doors, and windows. From both aesthetic and engineering standpoints, the efficacy of the building envelope varies greatly based on, for example, building site, geography, weather, and other factors. Product norms are therefore often inaccurate and insufficient bases for modeling a building envelope.

SUMMARY OF THE INVENTION

In one embodiment, a method includes causing a building model for a modeled building to be presented on a client computer. The building model includes a three-dimensional scene. The three-dimensional scene includes an individual rendering of at least selected building components for the modeled building. The method further includes permitting a user of the client computer to perform a virtual walkthrough of the three-dimensional scene. In addition, the method includes receiving a user change to the three-dimensional scene via a graphical user interface (GUI) component. Furthermore, the method includes dynamically changing the building model in accordance with the user change. The dynamically changing includes individually modifying an appearance of at least one building component of the at least selected building components in the three-dimensional scene.

In one embodiment, a system includes a server computer and a digital application. The server computer includes a processor and memory and is operable to communicate with a client computer over a computer network. The digital application is resident on the server computer and includes a product-visualization component operable to perform three-dimensional rendering. The server computer in combination with the digital application is operable to cause a building model for a modeled building to be presented on the client computer. The building model includes a three-dimensional scene. The three-dimensional scene includes an individual rendering of at least selected building components for the modeled building. The server computer in combination with the digital application is further operable to permit a user of the client computer to perform a virtual walkthrough of the three-dimensional scene. In addition, the server computer in combination with the digital application is operable to receive a user change to the three-dimensional scene via a graphical user interface (GUI) component. Furthermore, the server computer in combination with the digital application is operable to dynamically change the building model in accordance with the user change. The dynamic change includes individual modification of an appearance of at least one building component of the at least selected building components in the three-dimensional scene.

In one embodiment, a computer-program product includes a computer-usable medium having computer-readable program code embodied therein. The computer-readable program code is adapted to be executed to implement a method. The method includes causing a building model for a modeled building to be presented on a client computer. The building model includes a three-dimensional scene. The three-dimensional scene includes an individual rendering of at least selected building components for the modeled building. The method further includes permitting a user of the client computer to perform a virtual walkthrough of the three-dimensional scene. In addition, the method includes receiving a user change to the three-dimensional scene via a graphical user interface (GUI) component. Furthermore, the method includes dynamically changing the building model in accordance with the user change. The dynamically changing includes individually modifying an appearance of at least one building component of the at least selected building components in the three-dimensional scene.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 3B illustrates examples of input values that can be used as part of a process for configuring an analytics component;

DETAILED DESCRIPTION OF ILLUSTRATIVE EMBODIMENTS OF THE INVENTION

In various embodiments, a BIM solution may be developed that improves building-modeling accuracy via a greater focus on, for example, building-site attributes. For purposes of this patent application, building-site attributes refer to qualities of a building site that are external to building components. Building-site attributes may include, for example, direction and brightness of sunlight, building surroundings (e.g., buildings, streets, highways, and other landmarks), weather, and the like. In a typical embodiment, the improved building-modeling accuracy may be accomplished in a repeatable fashion.

Figure 1:
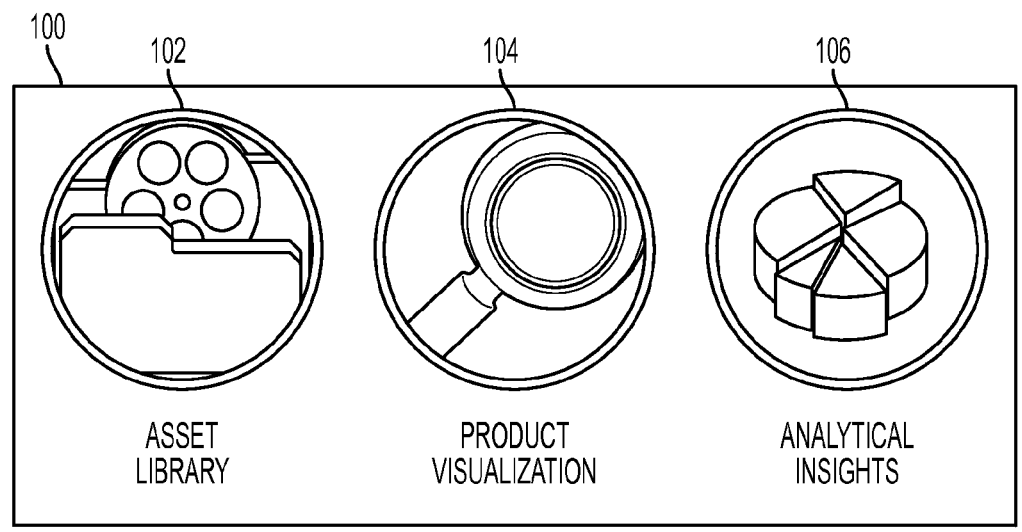
FIG. 1 describes illustrative software that expands the functionality of BIM software.

FIG. 1 describes an illustrative digital application 100. In various embodiments, the digital application 100 may expand the functionality, for example, of commercial off-the-shelf (COTS) BIM software. In various other embodiments, the digital application 100 may constitute standalone BIM software that replaces COTS BIM software. The digital application 100, in a typical embodiment, may include an asset library 102, a product-visualization component 104, and an analytics component 106. The asset library 102 may include, for example, three-dimensional cityscapes, three-dimensional models of buildings, photographs, product specifications for building components, multimedia simulations of buildings, and modeling properties of building components such as, for example, window glass, mullions, and the like. The asset library 102 may also include, for example, images, documents, processes, templates, and presentations that are applicable to modeling.

The product-visualization component 104 is typically operable to produce a three-dimensional, photorealistic view of a building that considers building-site attributes such as, for example, lighting, weather, and building surroundings. The three-dimensional, photorealistic view allows a user to navigate and virtually walk throughout the interior of the building and around the exterior of the building. The product-visualization component 104 is generally operable to introduce modeling variables such as, for example, time of day, specific weather conditions, a position of a building component, selection of alternative building components, or other dynamic conditions that may be of interest for a particular building. For example, the product-visualization component 104 is typically operable to permit a user to dynamically view photorealistic effects of exchanging particular building components for alternatives and/or modifying of modeling variables.

In a typical embodiment, the analytics component 106 is operable to produce analytical models for a particular building based on building-site attributes such as, for example, lighting, weather, and building surroundings. The analytics component 106 may produce analytical models relating, for example, to solar studies, shadow studies, wind studies, renewable-energy studies, acoustics studies, natural-ventilation studies, energy-model studies, and daylight studies. Furthermore, the analytics component 106 is typically operable to permit a user to modify and dynamically view effects of exchanging particular building components such as, for example, building-envelope components, for alternative building components.

Figure 2:
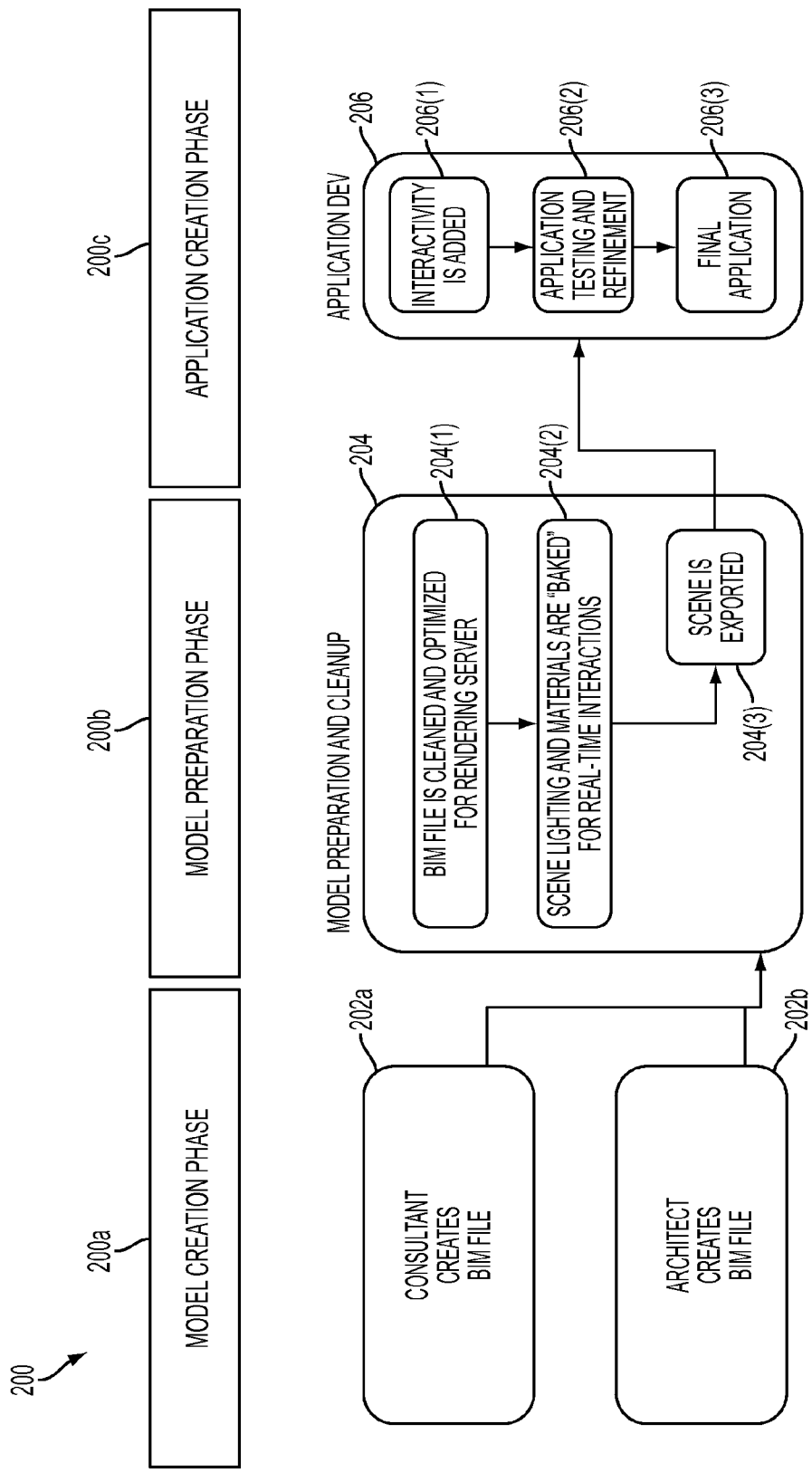
FIG. 2 describes an illustrative process for configuring a product-visualization component.

FIG. 2 describes an illustrative process 200 for configuring a product-visualization component such as, for example, the product-visualization component 104 of FIG. 1. The process 200 may include, for example, a model-creation phase 200a, a model-preparation phase 200b, and an application-creation phase 200c. In a typical embodiment, steps 202a and 202b may occur as part of the model-creation phase 200a, step 204 may occur as part of the model-preparation phase 200b, and step 206 may occur as part of the application-creation phase 200c.

At steps 202a and/or 202b, a BIM file such as, for example, a computer-aided design (CAD) file, may be received. In a typical embodiment, the BIM file may be generated via, for example, CAD or BIM software. The BIM file typically models a design for a prospective building. The BIM file typically includes three-dimensional objects that represent building components such as, for example, building-envelope components. As indicated in steps 202a and 202b, the BIM file may be received from an architect, a building-envelope vendor or consultant, or various other sources. After steps 202a and 202b, the process 200 proceeds to the model-preparation phase 200b.

Step 204 may include sub-steps 204(1), 204(2), and 204(3). At sub-step 204(1), the BIM file may be normalized to a style and format that may be required by particular three-dimensional rendering software. After sub-step 204(1), the process 200 proceeds to sub-step 204(2). At sub-step 204(2), modeling properties for the three-dimensional objects may be configured based on building-site attributes such as, for example, lighting, weather, building surroundings, and the like. In a typical embodiment, some or all modeling properties for the three-dimensional objects may be initially extracted from an asset library such as, for example, the asset library 102 of FIG. 1, for use as a starting point. In addition, in various embodiments, normalized properties from product specifications may be extracted from the asset library 102 and used as a basis to develop a starting point for modeling properties. Tables 1-3 (included at the end of this Detailed Description) describe, inter alia, exemplary modeling properties that can be configured and maintained in a configuration file, for example, by a three-dimensional rendering server.

In a typical embodiment, the modeling properties are configurable via domain expertise regarding, for example, how the building components should appear given the building-site attributes and how the appearance should differ in relation to the modeling variables. At least a portion of the building-site attributes may be acquired using, for example, global positioning system (GPS) or geographic coordinates of the prospective building. For example, via the GPS or geographic coordinates, a three-dimensional cityscape may be imported from an asset library such as, for example, the asset library 102 of FIG. 1, and used to develop three-dimensional scenes that are either or internal or external to the prospective building.

For example, internal three-dimensional scenes may be developed that accurately depict a complete room inclusive of, for example, photorealistic views through windows to the outside. By way of further example, external three-dimensional scenes may be developed that accurately depict an external view of the prospective building inclusive of, for example, photorealistic views through windows to the inside of the prospective building. By way of additional example, three-dimensional scenes may be developed that permit a user to navigate through the interior of the prospective building and through the exterior of the prospective building via, for example, doors and windows. Additionally, in various embodiments, three-dimensional scenes may be developed that permit a user, for example, to move within the scenes (i.e., perform a virtual walkthrough), to rotate 360 degrees from a point of reference, to zoom in, and to zoom out, for example, to a bird's-eye view.

The GPS or geographic coordinates of the prospective building may be further utilized to develop additional ones of the building attributes such as, for example, brightness, direction of daylight and shadows. Assessment of the daylight brightness and direction may involve consideration, for example, of an orientation of the prospective building and obstructions such as, for example, neighboring trees or other buildings. In a typical embodiment, the modeling properties of the building components are configurable to reflect, for example, any applicable color, hue, brightness, or transparency of the building components and the surroundings of the prospective building. In a typical embodiment, the modeling properties of the building components are also configurable to reflect appropriate variance responsive to changes in modeling variables such as, for example, time of day or specific weather conditions.

In addition, in various embodiments, modeling properties for alternative building components may be configured. In a typical embodiment, the alternative building components may be potential substitutes, or alternatives, to one or more of the building components (e.g., building-envelope components). In a typical embodiment, each of the alternative building components may be configured as described above with respect to the building components. The configuration of alternative building components facilitates comparative analysis and visualization, as will be described in more detail below.

In a typical embodiment, sub-step 204(2) yields one or more three-dimensional scenes that include the configured modeling properties of the building components and the alternative building components for each of the modeling variables. For example, the one or more three-dimensional scenes may include photorealistic internal and/or external views relative to the prospective building. After step 204(2), the process 200 proceeds to sub-step 204(3). At sub-step 204(3), the one or more three-dimensional scenes may be exported, for example, to a three-dimensional-rendering server. After sub-step 204(3), step 204 is concluded and the process 200 proceeds to the application-creation phase 200c.

The application-creation phase 200c typically includes application-development activities that may occur, for example, on the three-dimensional rendering server. In a typical embodiment, the three-dimensional rendering server hosts three-dimensional rendering software. The application-creation phase 200c typically yields a product-visualization application component such as, for example, the product-visualization component 104 of FIG. 1, that is based on the one or more three-dimensional scenes developed in the model-preparation phase 200b. The application-creation phase 200c includes step 206. As depicted, step 206 includes sub-steps 206(1), 206(2), and 206(3).

At step 206(1), user-interactivity features may be added to the product-visualization application component via an application programming interface (API) for the three-dimensional rendering software. The user-interactivity features may include, for example, operability to dynamically adjust a three-dimensional rendering based on user changes to the building components and/or the building-site attributes. After step 206(1), the process 200 proceeds to step 206(2). At step 206(2), testing and refinement may occur. If application changes are deemed necessary, the process 200 may return to step 206(1). Otherwise, the process 200 proceeds to step 206(3).

At step 206(3), application development of the product-visualization application component is complete. In a typical embodiment, the three-dimensional rendering server is operable to present the product-visualization component over a network as described in more detail with respect to FIG. 5. After step 206, the application-creation phase 200c and the process 200 conclude. In a typical embodiment, all models and artifacts developed during the process 200 are stored in an asset repository such as, for example, the asset repository 102 of FIG. 2. In a typical embodiment, resources, for example, of the three-dimensional rendering server may be preserved via implementation of modeling-efficiency concepts. Examples of modeling-efficiency concepts that may be employed in the process 200 are described in U.S. Provisional Application No. 61/453,262, which is incorporated herein by reference.

Figure 3A:
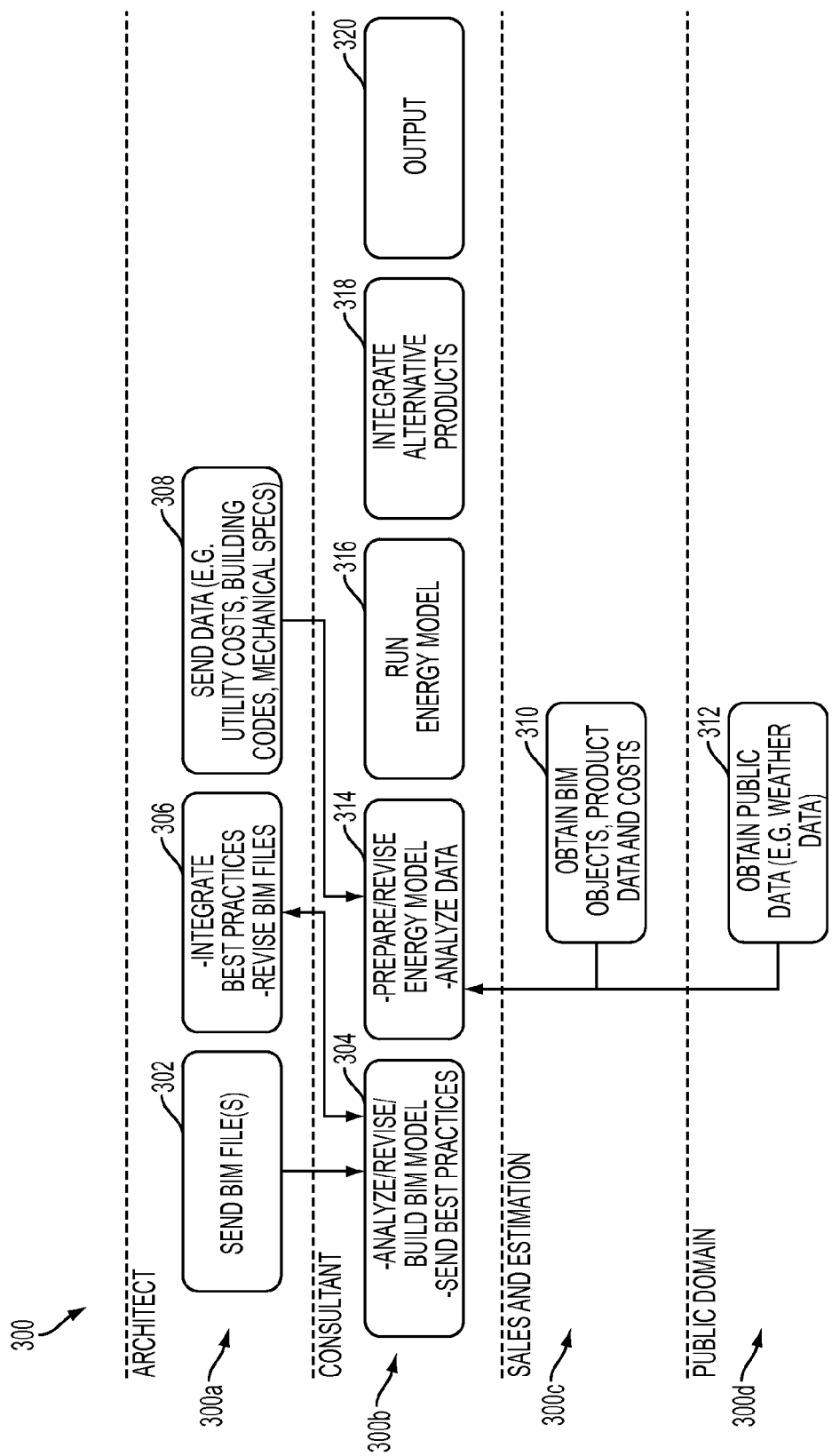
FIG. 3A describes an illustrative process for configuring an analytics component.

FIG. 3A describes an illustrative process 300 for configuring an analytics component such as, for example, the analytics component 104 of FIG. 1. In various embodiments, the process 300 may involve various entities including, for example, an architect 300a, a BIM consultant 300b, and a sales team 300c. The process 300 may also integrate information from a public domain 300d in order to produce, for example, an analytical model. The process 300 begins at step 302.

At step 302, the architect 300a may send a BIM file such as, for example, a CAD file, to the BIM consultant 300b. In a typical embodiment, the BIM file may be generated via, for example, CAD or BIM software. The BIM file typically includes three-dimensional objects that represent building components such as, for example, building-envelope components. After step 302, the process 300 proceeds to step 304. At step 304, the BIM consultant 300b may revise the BIM file based on domain expertise and send modeling best practices to the architect 300a. After step 304, the process 300 proceeds to step 306.

At step 306, the architect 300a may integrate the modeling best practices from the BIM consultant 300b and revise the BIM file. After step 306, the process 300 proceeds to step 308. At step 308, the architect 300a may send supplemental data to the BIM consultant 300b. The supplemental data is typically data that is necessary for a particular analytical model but that is not included in the BIM file. The supplemental data may include, for example, utility costs, building codes, and mechanical specifications for various building components. After step 308, the process 300 proceeds to step 310.

At step 310, the sales team 300c may obtain, for example, the three-dimensional objects from the BIM file and product specifications from an asset repository such as, for example, the asset repository 102 of FIG. 1. The sales team 300c may also obtain and/or estimates cost information. The cost information may include, for example, acquisition cost and operational costs (if applicable) for the building components. The estimated acquisition cost and operational costs may be sent to the BIM consultant 300b. After step 310, the process 300 proceeds to step 312. At step 312, the BIM consultant 300b may obtain public data from the public domain 300d that may be necessary for a particular analytical model. The public data may include, for example, weather data. After step 312, the process 300 proceeds to step 314.

At step 314, the BIM consultant 300b analyzes the public data, the supplemental data, the product specifications, the cost information from the sales team 300c, and the revised BIM file from the architect 300a. In a typical embodiment, the BIM consultant 300b prepares an analytical model as a result of the analysis. Preparation of the analytical model may involve establishing, based on domain expertise, input data values that are necessary for a particular type of analytical model. For example, the input data values may be derived from the public data, the supplemental data, the product specifications, the cost information and/or the revised BIM file. Examples of the input data values will be described with respect to FIG. 3B. Examples of types of analytical models that may be prepared will be described with respect to FIG. 4A. After step 314, the process 300 proceeds to step 316.

At step 316, the BIM consultant 300b may run the analytical model to produce an output. The output may include, for example, charts, graphs, animations, and three-dimensional scenes. Exemplary outputs that may be produced by the analytical model will be described with respect to FIGS. 4B-4G. After step 316, the process 300 proceeds to step 318.

At step 318, the BIM consultant 300b may integrate alternative building components into the analytical model. In a typical embodiment, the alternative building components enable an analytics component such as, for example, the analytics component 106 of FIG. 1, to receive and dynamically implement user changes. The user changes may include, for example, substituting one of the alternative components for one of the building components for purposes of comparative analysis and visualization. After step 318, the process 300 proceeds to step 320. At step 320, the BIM consultant 300b may output the analytical model to a three-dimensional rendering server for use as an analytics component such as, for example, the analytics component 106 of FIG. 1. In a typical embodiment, all models and artifacts developed during the process 300 are stored in an asset repository such as, for example, the asset repository 102 of FIG. 1.

FIG. 3B illustrates examples of input values that can be used as part of a process for configuring an analytics component. In particular, FIG. 3B illustrates product specifications 322 and cost information 324. For example, in various embodiments, the cost information 324 could be developed by a sales team such as, for example, during step 310 of the process 300 of FIG. 3A. By way of further example, in various embodiments, the product specifications 322 and the cost information 324 could form part of the input values utilized at step 314 of the process 300 of FIG. 3.

Figure 4A:
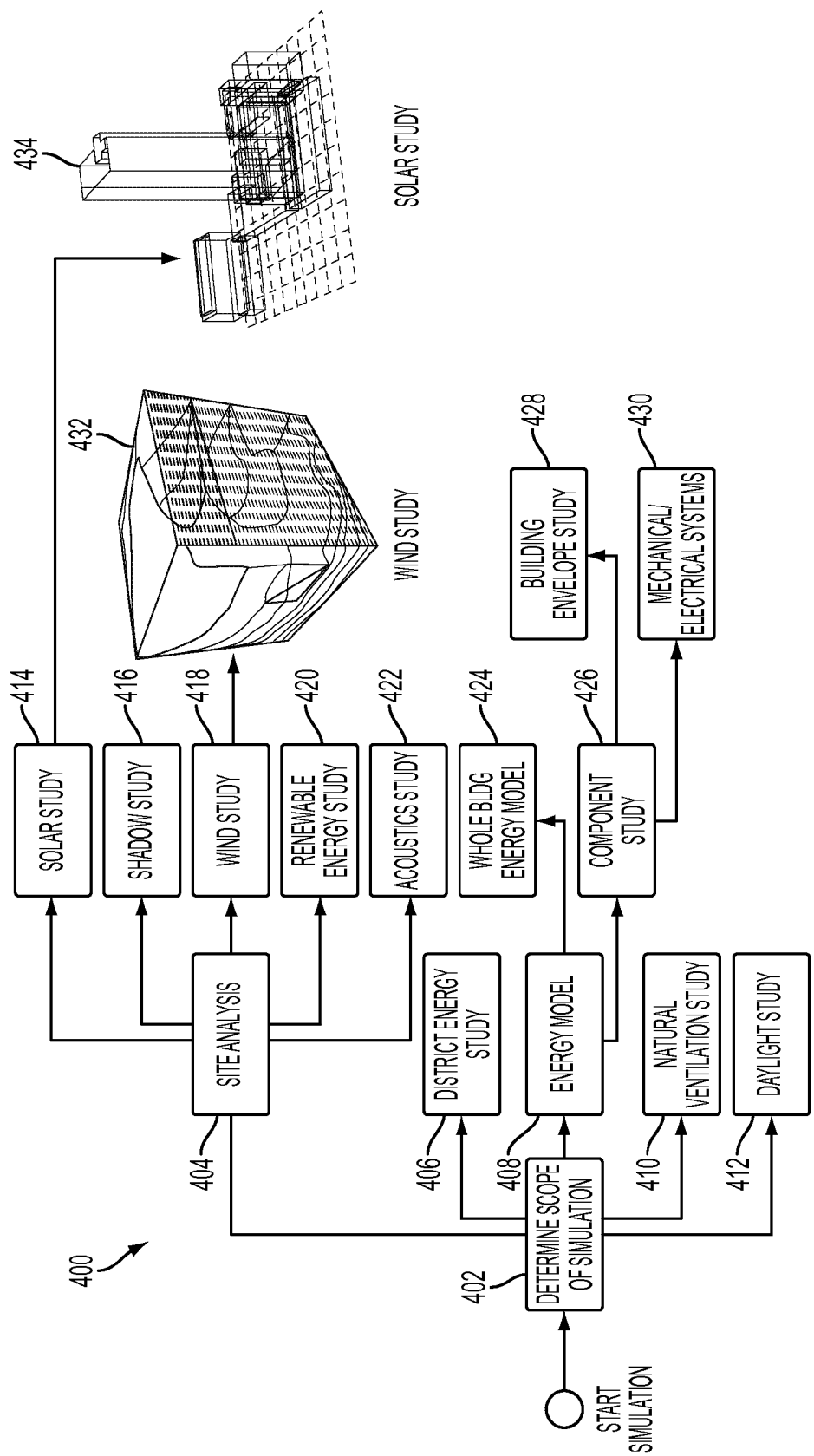
FIG. 4A describes various illustrative analytical models.

FIG. 4A is a flow 400 that describes various illustrative analytical models. One of ordinary skill in the art will appreciate that the various illustrative analytical models are exemplary in nature. Therefore, the flow 400 should not be interpreted to require a particular sequence of steps when generating an analytical model. At step 402, a scope of simulation is determined. In other words, it may be determined which and how many analytical models are advantageous for a particular BIM scenario. For example, the scope may include a site analysis 404, a district-energy study 404, an energy model 408, a natural-ventilation study 410, and/or a daylight study. In various embodiments, the scope may include more, fewer, or different analyses, studies, or models.

In a typical embodiment, the site analysis 404 may include a solar study 414, a shadow study 416, a wind study 418, a renewable-energy study 420, and/or an acoustics study 422. In various embodiments, the site analysis 404 may include more, fewer, or different analyses, studies, or models. Various analyses, studies, or models may include visualizations of a particular building.

For example, the shadow study 416 can result in, for example, a representation of a building's shadow impact on surroundings. For example, during the wind study 418 and the solar study 414, a wind-study visualization 432 and a solar-study visualization 434 may be generated, respectively. In various embodiments, the wind-study visualization 432 can be a wind-velocity map as shown in FIG. 4A, a pressure map, or the like. Also, as depicted in FIG. 4A, the solar-study visualization 434 can be a solar-radiation map that depicts building insulation relative to specific exterior building components.

By way of example, the acoustics study 422 may involve consideration of a geographic location and potential sources of noise near that location. For example, based on GPS coordinates at a building site, it may be determined that an airport is close enough to the building site to be a potential source of noise. In various embodiments, noise may be produced at the airport and/or as a result of air traffic near the building site as aircraft arrive or depart from the airport. In a typical embodiment, noise levels (e.g. decibels) may be calculated based on, for example, likely flying altitudes. The noise levels may also be varied based on, for example, environmental factors that may mitigate or aggravate the noise (e.g., wind). In a typical embodiment, noise levels may then be modeled inside a potential building by considering modeling properties of building components such as, for example, windows. For example, a user may be permitted to sample a sound of an airplane passing over the building. Furthermore, by swapping various building components for alternative building components, the user may be permitted to hear and compare the change in the sound of the airplane. One of ordinary skill in the art will appreciate that the acoustics study 422 is not limited to airplanes and could also be applied to any other potential source of noise such as, for example, nearby streets or highways, neighboring factories, and the like.

In a typical embodiment, the energy model 408 may include a whole-building energy model 424 and/or a building-component study 426. An example of the whole-building energy model 424 is described with respect to FIGS. 4B-4G. The building-component study 426 may include, for example, a building-envelope study 428 and/or a mechanical/electrical systems study 430. In various embodiments, the energy model 408 and the component study 426 may include more, fewer, or different analyses, studies, or models from those listed above.

FIGS. 4B-4G describe exemplary outputs that can be generated by an analytics model as described with respect to FIGS. 3A and 4A. In particular, in various embodiments, FIGS. 4B-4G are exemplary outputs of a whole-building energy model such as, for example, the whole-building energy model 424 of FIG. 4A.

Figure 4B:
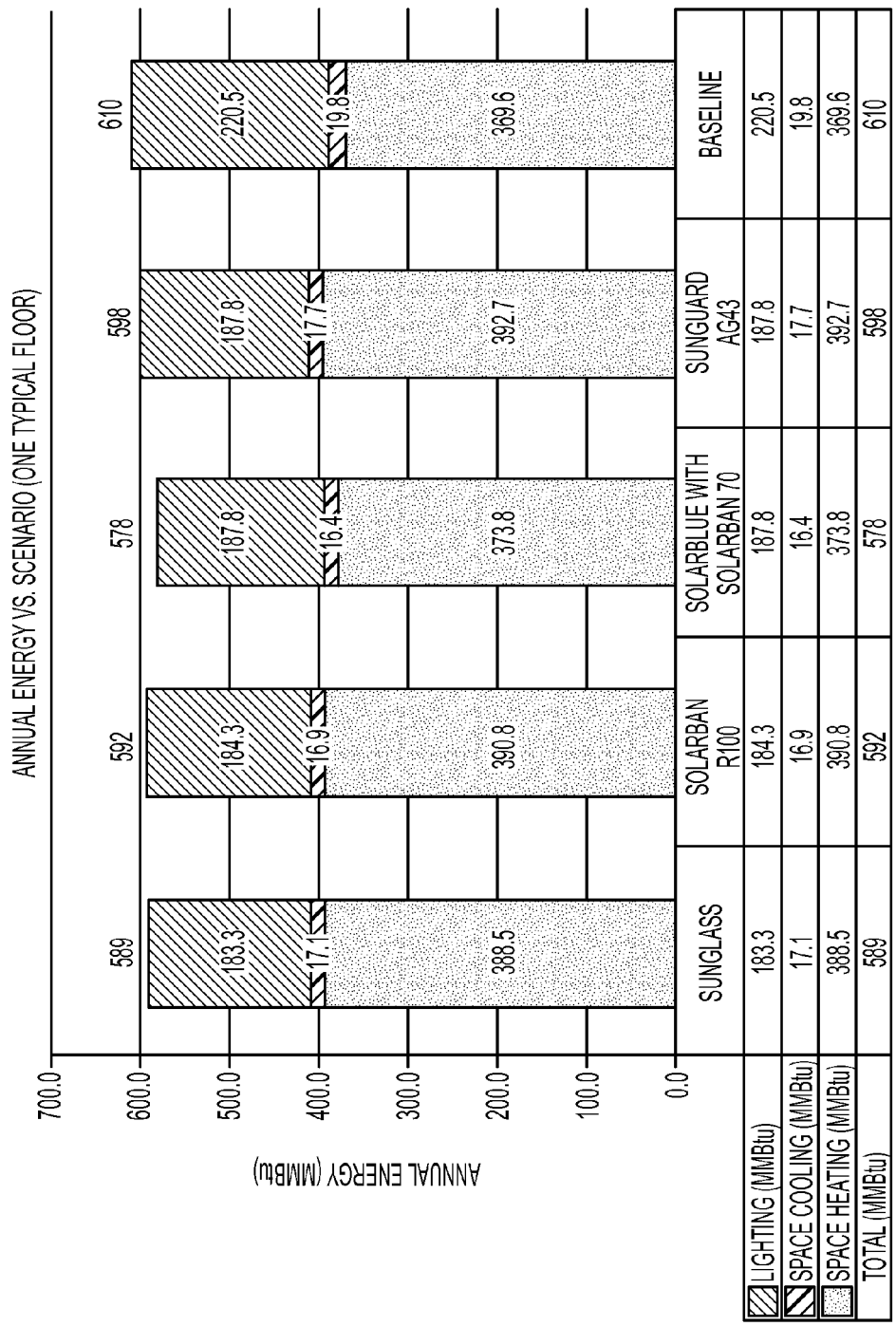
FIGS. 4B-4G describe exemplary outputs that can be generated by an analytical model.

FIG. 4B is a graphical comparative analysis of selected building components relative to annual energy usage for a typical floor.

Figure 4C:
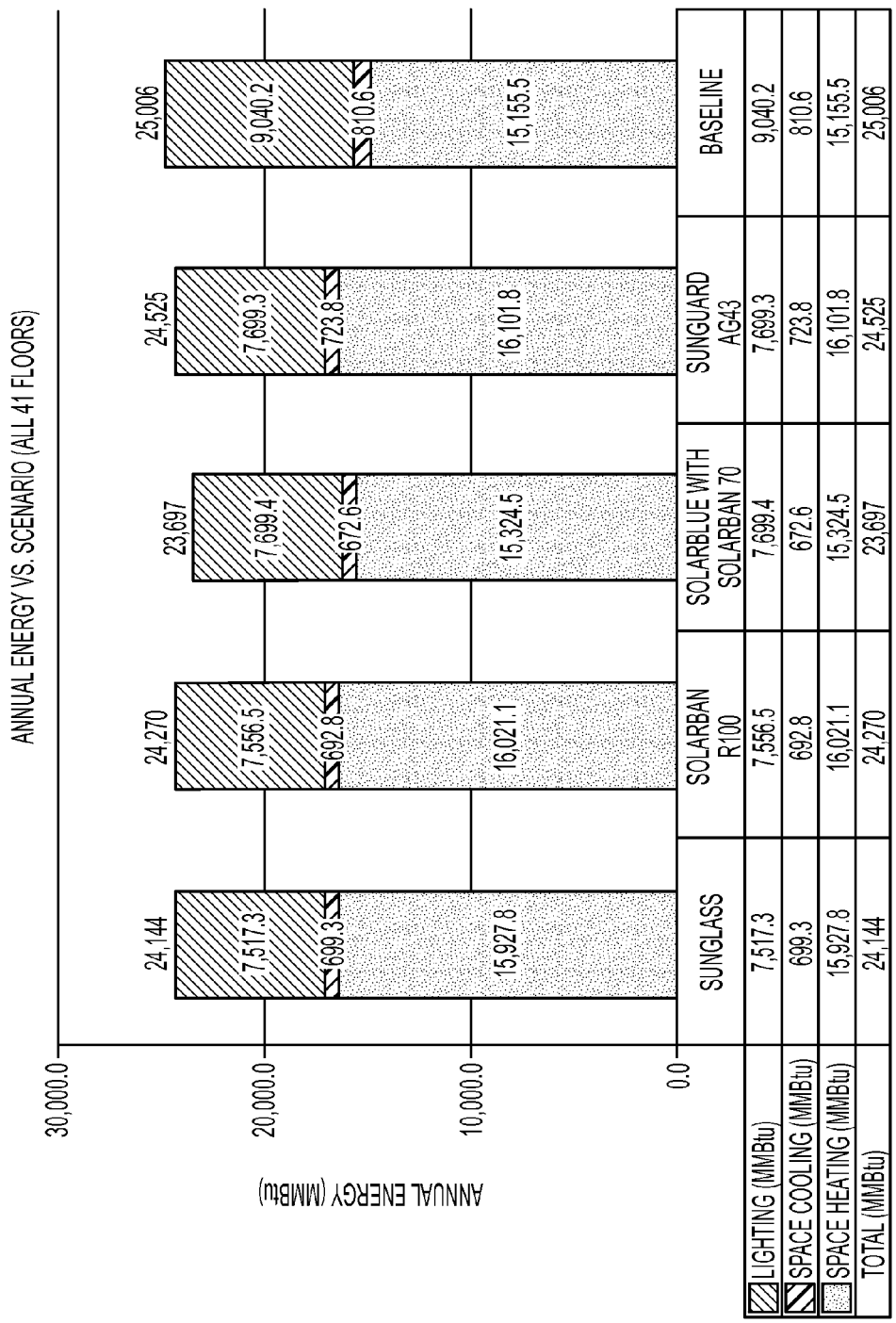

FIG. 4C is a graphical comparative analysis of selected building components relative to annual energy usage for all forty-one floors of an exemplary building.

Figure 4D:
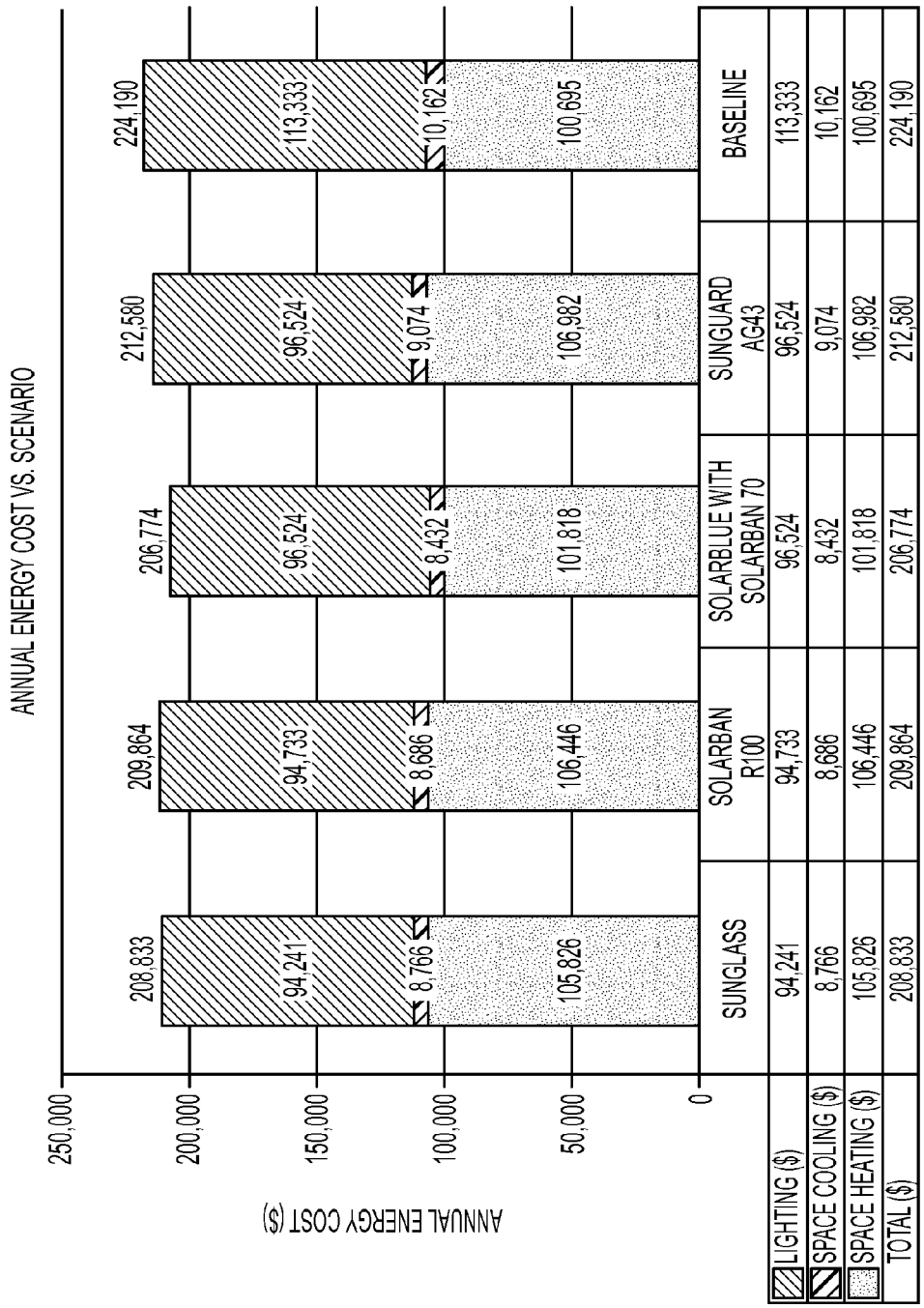

FIG. 4D is a graphical comparative analysis of selected building components relative to annual energy cost for an exemplary building.

Figure 4E:
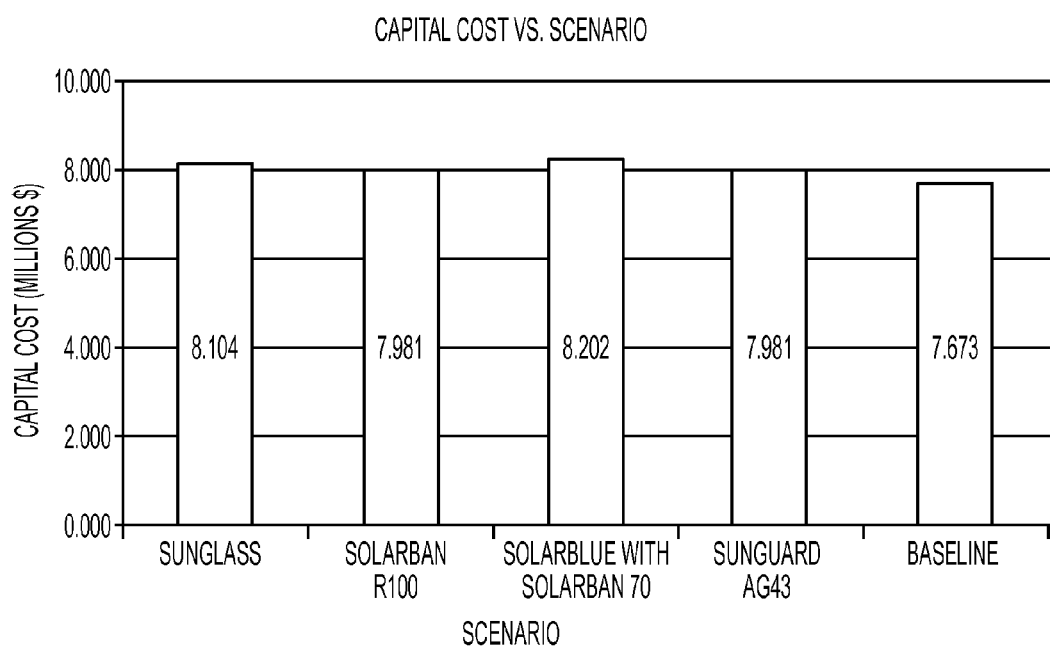

FIG. 4E is a graphical comparative analysis of selected building components relative to capital cost for an exemplary building.

Figure 4F:
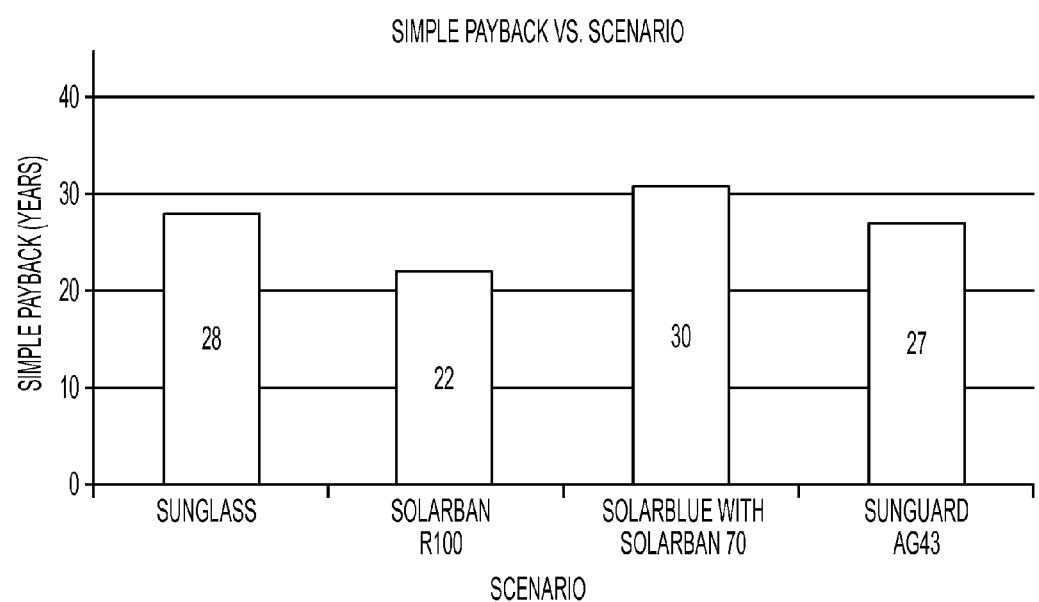

FIG. 4F is a graphical comparative analysis of selected building components relative to a payback period based on capital cost and projected energy savings.

Figure 4G:
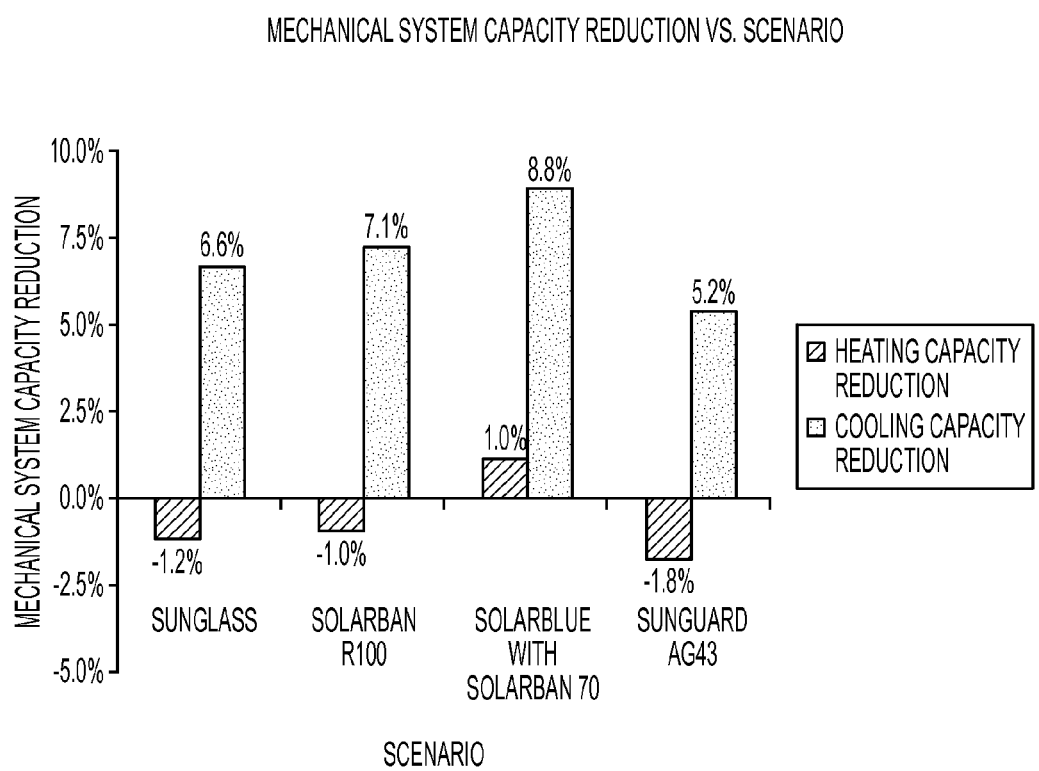

FIG. 4G is a graphical comparative analysis of selected building components relative to an estimated mechanical system capacity reduction.

Figure 5:
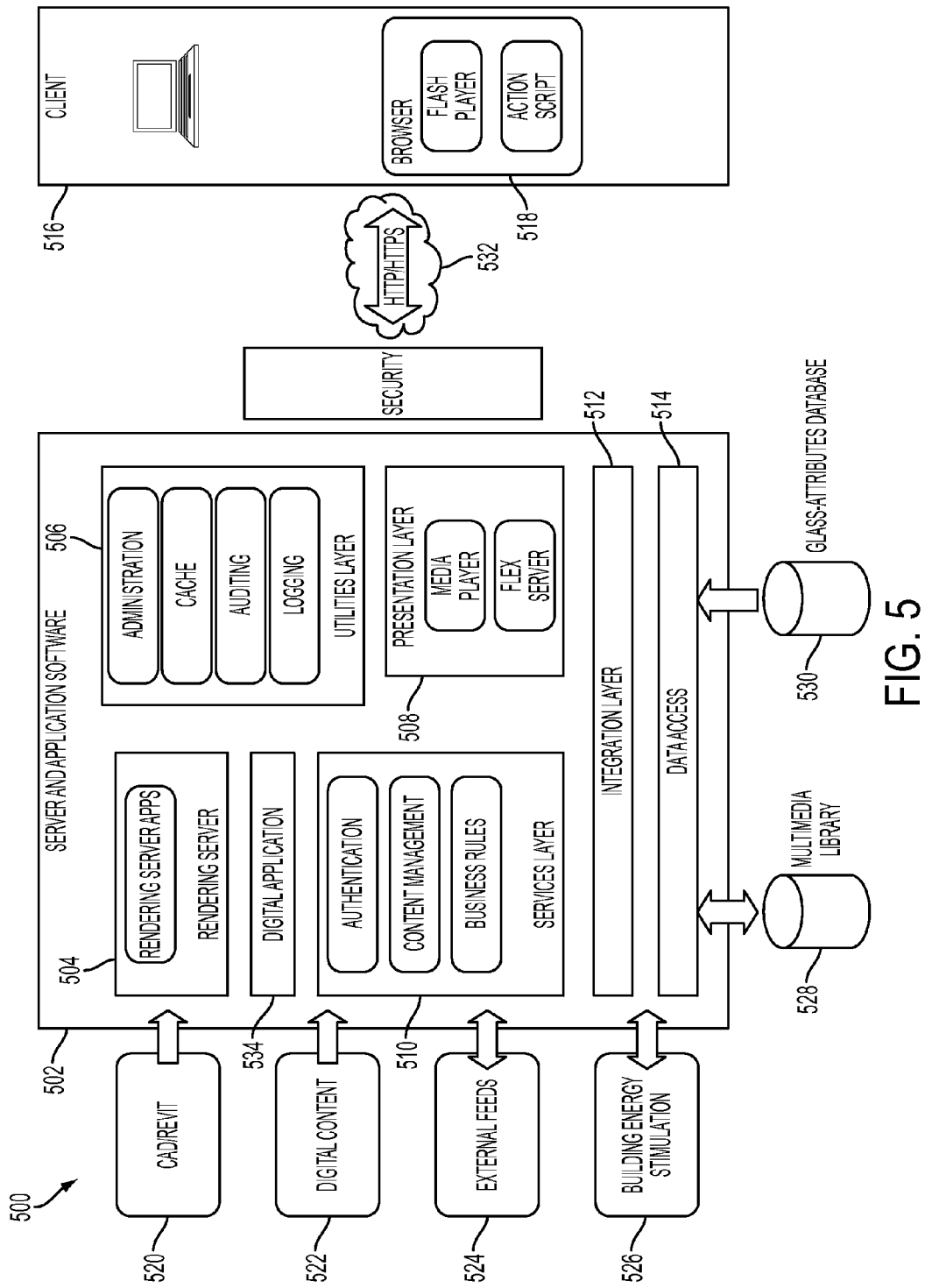
FIG. 5 describes an illustrative system that may execute a digital application.

FIG. 5 describes an illustrative system 500 that may execute, for example, the digital application 100 of FIG. 1. The system 500 may include a server computer 502 that is operable to communicate with a client computer 516 over a computer network 532 such as, for example, the Internet. In a typical embodiment, the server computer 502 includes three-dimensional rendering software 504, a digital application 534, a utilities layer 506, a presentation layer 508, a services layer 510, an integration layer 512, and a data-access layer 514. In a typical embodiment, the server computer 502 may receive as inputs a BIM file 520 and digital content 522. In a typical embodiment, the server computer 502 may receive as input or produce as output, for example, an external feed 524 or an analytical model 526. Further, the server computer 502 may be operable to send and receive, for example, from a multimedia library 528 and a glass-attributes library 530. In a typical embodiment, the client computer 516 has resident and operating thereon a web browser 508.

As mentioned above, the server computer 502 may receive input via, for example, the BIM file 520, the digital content 522, the external feeds 524, the analytical model 526, the multimedia library 528, and the glass-attributes library 530. In a typical embodiment, the BIM file 520 may be for example, a CAD file generated from third-party BIM software. The digital content 522 may include, for example, three-dimensional cityscapes and other three-dimensional models. In a typical embodiment, the external feeds 524 may include, for example, configured modeling properties of building components that are included in the BIM file 520. For example, the external feeds 524 may include the product-visualization application component developed during the process 200 of FIG. 2. The analytical model 526 may include analytical models such as, for example, the illustrative analytical models discussed with respect to FIGS. 3 and 4. The multimedia library 528 may include, for example, animations and other visualizations related to various buildings. The glass-attributes database 530 may include, for example, modeling properties and specifications of various glass products (e.g., windows). U.S. Pat. No. 7,257,548, which is incorporated herein by reference, describes, inter alia, exemplary glass properties that can be used to develop and configure modeling properties. In a typical embodiment, the glass-attributes library 530 and the multimedia library 528 can collectively represent all or part of an asset library such as, for example, the asset library 102 of FIG. 1. In addition, in various embodiments, the input described above may be retrieved from the asset library.

The utilities layer 508 of the server computer 502 may include, for example, administrative, caching, auditing, and logging functionality. The administrative, caching, auditing, and logging functionality will be apparent to one of ordinary skill in the art and therefore will not be discussed in detail herein. The services layer 510 may include, for example, an authentication service, a content-management service, and a business-rules service.

The data access layer 514, in a typical embodiment, is operable to extract, transform, and load data from a plurality of sources including, for example, the multimedia library 528 and the glass-attributes database 530. The integration layer 512 typically includes services operable to provide a unified view of data that may accessed from various sources via, for example, the data-access-layer 514. The presentation layer 508, in a typical embodiment, may cause, for example, renderings from the three-dimensional rendering software to be displayed on the client computer 516. The presentation layer 508 may further enable interactivity via, for example, establishment of a graphical user interface on the client computer 516.

In a typical embodiment, the digital application 534 may be similar to the digital application 100 of FIG. 1. In operation, the server computer 502, via the digital application 534, may serve a graphical user interface (GUI) over the computer network 532 to the client computer 516 that is operable to be viewed, for example, by the browser 518. In a typical embodiment, the digital application 534 may enable the user of the client computer 516, for example, to navigate a product-visualization component application such as, for example, the product-visualization component application described with respect to FIG. 2. In a typical embodiment, the digital application 534 utilizes the three-dimensional rendering software 504 to render, for example, three-dimensional scenes.

Furthermore, the digital application 534 may provide user-interface controls to the user of the client computer 516. For example, the user-interface controls may allow the user to select among virtual rooms such as, for example, a conference room, corner office, or lobby. In addition, the user-interface controls can enable the user of the client computer 516 to select alternative building components for a prospective building and dynamically view photorealistic effects of the alternative building components.

Glass products such as windows are examples of building components that, in various embodiments, can be adjusted using the user-interface controls. For example, in various embodiments, the user can select among windows that vary in color or hue and/or other ways (e.g., uncoated, low-e, reflectivity, silk-screened, etc.). Continuing this example, the user can dynamically view photorealistic effects of exchanging particular glass types for other glass types. Mullions are another example of building components that, in various embodiments, can be adjusted using the user-interface controls. In a similar fashion, the user-interface controls also allow the user to dynamically change a mullion finish and dynamically view photorealistic effects of the change. Examples of types of mullion finishes that could be selected include, for example, anodized (e.g., clear, bronze, black), stainless (e.g., linen, polished, imperial), and painted. Likewise, by way of further example, the user-interface controls can permit the user to modify exterior building components such as, for example, stone types, vertical structural silicone, and horizontal structural silicon.

Additionally, in various embodiments, the user-interface controls also allow the user of the client computer 516 to reposition building components. For example, in various embodiments, the user-interface controls permit the user of the client computer 516 to adjust depth, width, and spacing of mullions and view photorealistic effects of the change.

Moreover, the digital application 534 may enable the user of the client computer 516, for example, to modify modeling variables for the prospective building and dynamically view photorealistic effects of the modification(s). The modified modeling variables can include, for example, time of day, specific weather conditions, a position of building components, selection of alternative building components, or other dynamic conditions that may be of interest for a particular building.

The digital application 534 may also enable the user of the client computer 516, for example, to navigate an analytical model such as, for example, the illustrative analytical models described with respect to FIGS. 3-4G. The user of the client computer 516 may, for example, select an analytical model and dynamically view effects, for example, of exchanging building components for alternative building components via, for example, a new comparative analytical model. Furthermore, the digital application 534 may enable the user of the client computer 516 to access, for example, selected portions of an asset library such as, for example, the asset library 102 of FIG. 1. In that way, the user may view three-dimensional scenes and other assets that may be included in the asset library.

Figure 6:
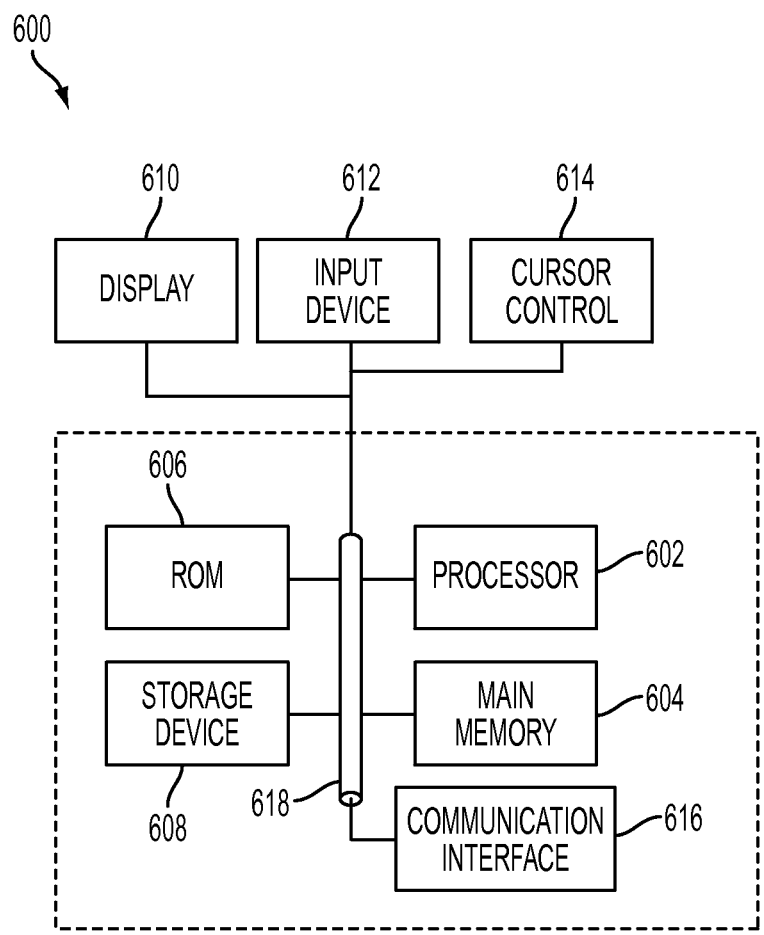
FIG. 6 illustrates an embodiment of a computer system.

FIG. 6 illustrates an embodiment of a computer system 600 on which various embodiments of the invention may be implemented such as, for example, the digital application 100 of FIG. 1. The computer system 600 may be, for example, similar to the server computer 502 of FIG. 5 or the client computer 516 of FIG. 5. The computer system 600 may be a physical system, virtual system, or a combination of both physical and virtual systems. In the implementation, a computer system 600 may include a bus 618 or other communication mechanism for communicating information and a processor 602 coupled to the bus 618 for processing information. The computer system 600 also includes a main memory 604, such as random-access memory (RAM) or other dynamic storage device, coupled to the bus 618 for storing computer readable instructions by the processor 602.

The main memory 604 also may be used for storing temporary variables or other intermediate information during execution of the instructions to be executed by the processor 602. The computer system 600 further includes a read-only memory (ROM) 606 or other static storage device coupled to the bus 618 for storing static information and instructions for the processor 602. A computer-readable storage device 608, such as a magnetic disk or optical disk, is coupled to the bus 618 for storing information and instructions for the processor 602. The computer system 600 may be coupled via the bus 618 to a display 610, such as a liquid crystal display (LCD) or a cathode ray tube (CRT), for displaying information to a user. An input device 612, including, for example, alphanumeric and other keys, is coupled to the bus 618 for communicating information and command selections to the processor 602. Another type of user input device is a cursor control 614, such as a mouse, a trackball, or cursor direction keys for communicating direct information and command selections to the processor 602 and for controlling cursor movement on the display 610. The cursor control 614 typically has two degrees of freedom in two axes, a first axis (e.g., x) and a second axis (e.g., y), that allow the device to specify positions in a plane.

The term "computer readable instructions" as used above refers to any instructions that may be performed by the processor 602 and/or other component of the computer system 600. Similarly, the term "computer readable medium" refers to any storage medium that may be used to store the computer readable instructions. Such a medium may take many forms, including, but not limited to, non volatile media, volatile media, and transmission media. Non-volatile media include, for example, optical or magnetic disks, such as the storage device 608. Volatile media includes dynamic memory, such as the main memory 604. Transmission media includes coaxial cables, copper wire, and fiber optics, including wires of the bus 618. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 602 for execution. For example, the instructions may initially be borne on a magnetic disk of a remote computer. The remote computer can load the instructions into its dynamic memory and send the instructions over a telephone line using a modem. A modem local to the computer system 600 can receive the data on the telephone line and use an infrared transmitter to convert the data to an infrared signal. An infrared detector coupled to the bus 618 can receive the data carried in the infrared signal and place the data on the bus 618. The bus 618 carries the data to the main memory 604, from which the processor 602 retrieves and executes the instructions. The instructions received by the main memory 604 may optionally be stored on the storage device 608 either before or after execution by the processor 602.

The computer system 600 may also include a communication interface 616 coupled to the bus 618. The communication interface 616 provides a two-way data communication coupling between the computer system 600 and a network. For example, the communication interface 616 may be an integrated services digital network (ISDN) card or a modem used to provide a data communication connection to a corresponding type of telephone line. As another example, the communication interface 616 may be a local area network (LAN) card used to provide a data communication connection to a compatible LAN. Wireless links may also be implemented. In any such implementation, the communication interface 616 sends and receives electrical, electromagnetic, optical, or other signals that carry digital data streams representing various types of information. The storage device 608 can further include instructions for carrying out various processes for image processing as described herein when executed by the processor 602. The storage device 608 can further include a database for storing data relative to same.

Figure 7:
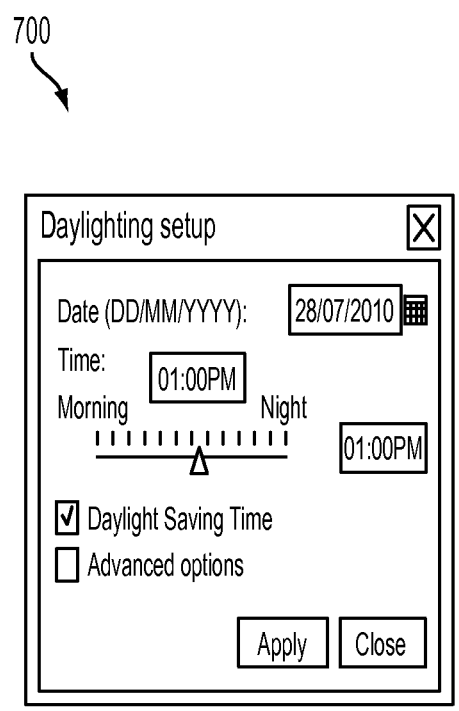
FIG. 7 shows an illustrative graphical user interface (GUI)

FIG. 7 shows an illustrative GUI 700 that may be served, for example, by the server computer 502 of FIG. 5 via the digital application 534 of FIG. 5. The GUI 700 allows a user, for example, to adjust lighting in a three-dimensional scene based on modeling variables such as, for example, a time of day and/or a time of year.

Figure 8A:
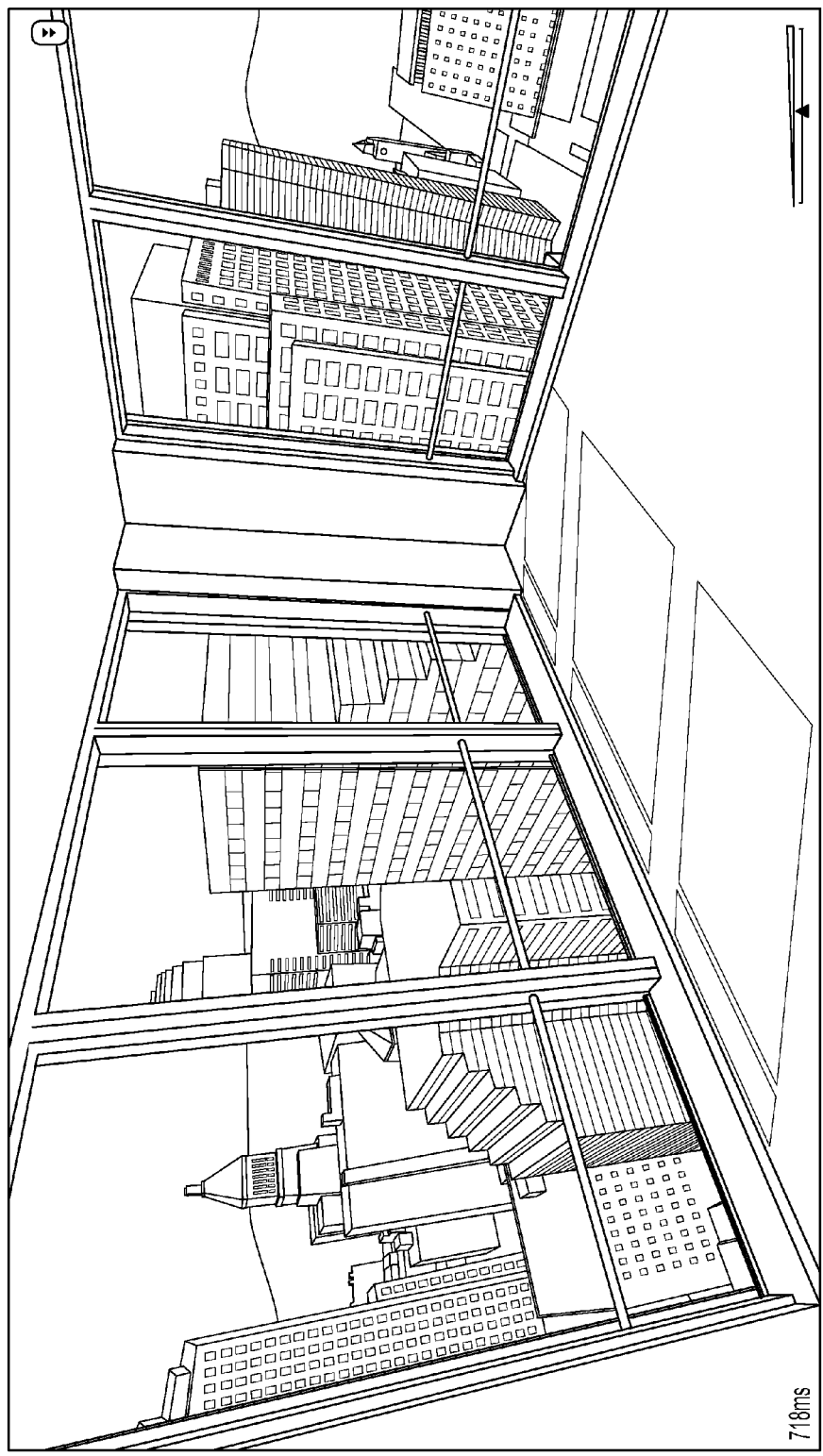
FIGS. 8A-8B show illustrative three-dimensional scenes.
Figure 8B:
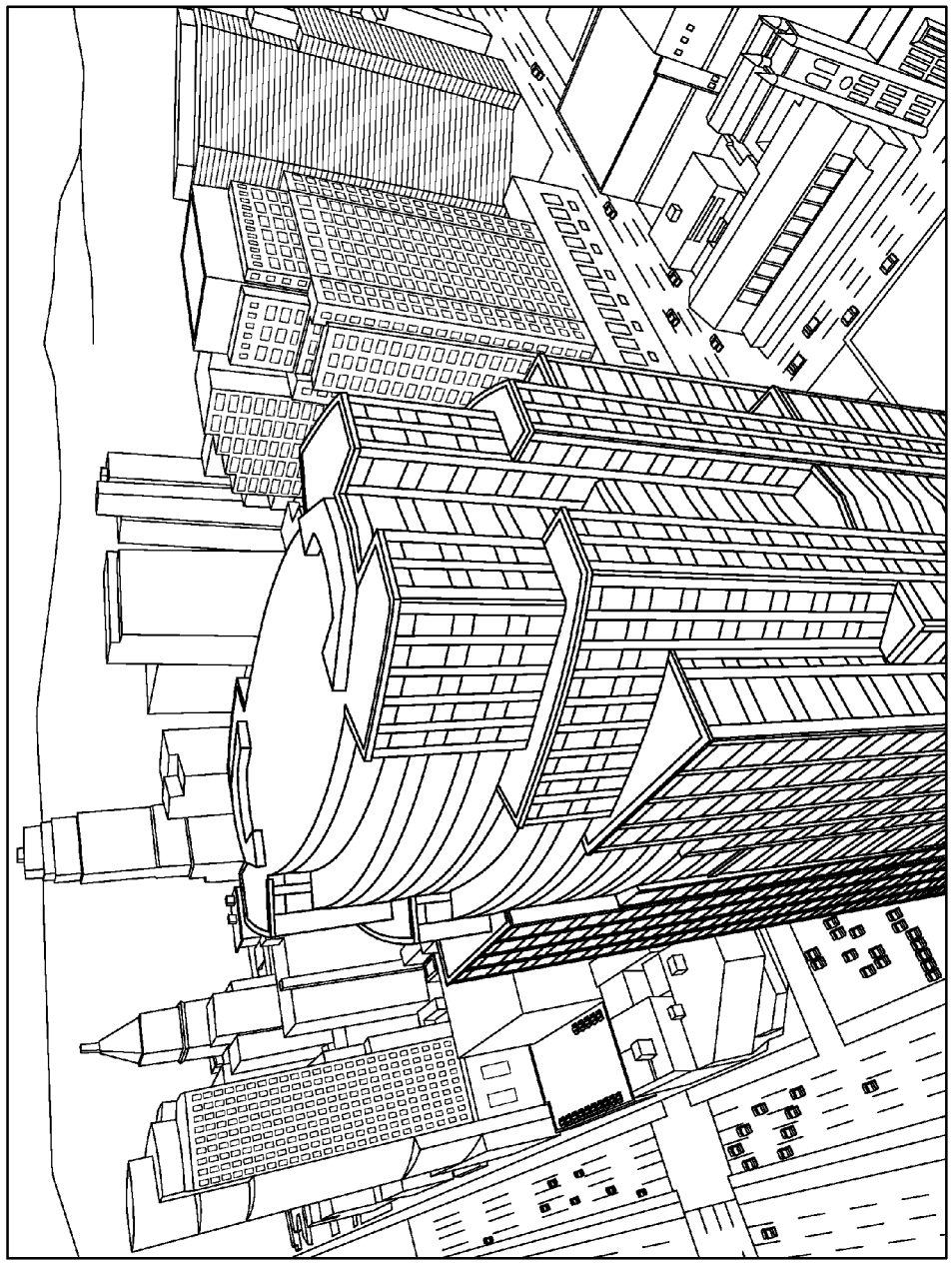

FIGS. 8A-8B show illustrative three-dimensional scenes that may be served, for example, by the server computer 502 of FIG. 5 via the digital application 534 and the three-dimensional rendering software 504. Appendix D includes additional illustrative three-dimensional scenes.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

TABLE 1

| PROPERTIES: VISUAL PROPERTIES | |
| --- | --- |
| Property/Properties | Description |
| background_color | This property describes the background color of the application outside of the main viewport. |
| max_width and max_height | These properties describe dimensions of a main viewport. These values can include, for example, a 1 pixel border so that a max_width value of 1282 corresponds to 1280. In a typical embodiment, interface elements of the application can be designed with a viewport of, for example, 1280 × 720, in mind. Values greater or less than this will result in a slightly less than ideal presentation of some of the UI elements. But the 3D rendered area will always adapt to the dimensions without any quality loss. |
| min_width and min_height | Similar to max_width and max_height, but these properties represent, for example, the smallest viewport dimensions allowed before scrollbars will be introduced. |
| display_bitrate | This can be changed to 'false', if the bitrate of the video in the viewport is not wanted. This can provide a good indication about the quality of the connection, and whether or not the streaming data rate needs to be adjusted. |

TABLE 2

| PROPERTIES: APPLICATION USER INTERFACE AND PEFORMANCE | |
| --- | --- |
| Property/Properties | Description |
| WALK_SPEED and WALK_SPEED_INTERNAL | These properties can be used to adjust a "speed" of a "walk" input method. They are separated so that the user can move around smaller, internal views with finer detail. |
| PANNING_FACTOR and PANNING_FACTOR_INTERNAL | Like the walk speed properties, these properties can control the detail the panning input method uses, depending on, for example, whether the user is in an internal view. |
| VIDEO_ENCODER_SETTINGS | These properties can be used to define the levels at which a video encoder can be set. For example, the user can access these selections from a rendering-options menu of the digital application. The default value is indicated by the presence of a Boolean value. |
| STILL_FRAMES_PER_RENDER | This property can define, for example, how many frames to render each pass while the user is not navigating in any way. This value is typically dependent on a number of graphics processing units (GPUs) that are enabled on the three-dimensional rendering server. Setting this value too high can adversely affect the performance of the application. Setting this value too low can make the image resolve too slowly. |
| NAVIGATE_FRAMES_PER_RENDER | This property is typically similar to the still_frames_per_render property. This property can be used, for example, to define the number of frames rendered while the user is navigating. In various embodiments, setting this value too high can make navigating in the digital application sluggish and less responsive. |
| SUN_SKY | This group of properties can be used, for example, to configure environment lighting. |
| LATITUDE | Latitude and longitude sub-properties can be used, for example, to determine a building's geographical position as coordinates. |
| LONGITUDE | Latitude and longitude sub-properties can be used, for example, to determine a building's geographical position as coordinates. |
| DATE | This property can be a default date used such as, for example, in MM/DD/YYYY format. |
| TIME | This property can be, for example, a default time used. |
| APPLY_ON_STARTUP | In a typical embodiment, if this property has a Boolean value of true, the default date/time will be applied at application startup. |

TABLE 3

| PROPERTIES: GENERAL INFO/SETTINGS | |
|---|---|
| Property/Properties | Description |
| BUILDING_NAME | This property can be used, for example, as a default image filename when saving images. |
| INTERIOR_TONEMAPPING | This property can be used, for example, to override tone-mapping options when the view is "internal." This is due to the fact that lighting is sometimes insufficient when the camera is "inside." |
| APPLY_CONFIG_ON_INIT | This property, when set to true, can apply the first configuration on application startup. |
| INSTANCE_SCALING_ENABLED | This property can be used, for example, to toggle scaling (of mullions, horizontals, spandrels, hcaps and vcaps) globally. If the model is not yet enabled for scaling, this property can be set to false to avoid unintended results. For example, controls in a Properties Panel of the application can remain enabled, but any changes made to them can be ignored. |
| SCALE_USING_ORG_VALUES | When set to true, scaling is accomplished by multiplying the scale factor set via the Properties Panel by the values defined in the instance_matrices property. This is for cases where the transformation matrix of objects use scaling properties that are not one. If all instances to be scaled use a scaling property of one in their transform matrices, then this can be set to false. |
| EXTERIOR_INSTANCE_SCALING_ENABLED | Even when the instance_scaling_enabled property is set to true, in various embodiments, scaling of external instances (e.g., spandrels, hcaps and vcaps) can still be disabled. If, for example, the exterior instances of the model are not enabled for scaling, this property can be set to false. |
| INSTANCE_MATRICES | This property can be used, for example, in conjunction with scale_using_org_values. In various embodiments, the data is stored as a JavaScript Object Notation (JSON) encoded object. In these embodiments, a JSON parser can be used to see the data in a more human-readable format. In various embodiments, this data can be obtained via a function within the application. |
| WALLTYPES | This property can be used, for example, to define walltypes that can be manipulated in the building. For example, this property can include a JSON-formatted array of objects. Each object in the array defines a walltype. In various embodiments, each walltype object contains five Properties. |
| ID | Unique numeric id |
| NAME | String used to describe the walltype. Used to fill a combobox that is used to select Walltypes in the Properties Panel. |
| SCALING | Boolean value used to enable/disable scaling. In a typical embodiment, this value is true ony if instance_scaling_enabled is set to true. |
| EXCLUDEDVIEWS | Comma-separated string of view Ids that lists views that do not contain this walltype. |
| DATA | This sub-property can contain, for example, further sub-properties that list all the instances that are part of each section of the walltype. Each property contains a comma-separated string of instance names. |
| INSTANCES | This sub-property lists, for example, the instances that make up the IGU used in the walltype. The instances that describe the "outer" glass typically have the string "Outer." |
| MULLIONINSTANCES | This sub-property lists, for example, instances that make up the mullions used in the walltype (interior). |
| MULLIONINSTANCESNOSCALE | This sub-property lists, for example, the instances that make up the mullions used in the walltype (interior). However, in various embodiments, these instances do not scale and only materials are applied to them. |
| HORIZONTALINSTANCES | This sub-property lists, for example, the instances that make up the horizontals used in the walltype (interior). |
| HOTIZONTALINSTANCESNOSCALE | This sub-property lists, for example, the instances that make up the horizontals used in the walltype (interior). However, in various embodiments, these instances not scale scale and only materials are applied to them. |
| SPANDRELINSTANCES | This sub-property lists, for example, the instances that make up the spandrels used in thewalltype (exterior). |
| SPANDRELINSTANCESNOSCALE | This sub-property lists, for example, the instances that make up the spandrels used in the walltype (exterior). However, in various embodiments these instances do not scale and only materials are applied to them. |
| SPANDRELFRITINSTANCES | This sub-property lists, for example, the instances that make up the frits used in the walltype (exterior). |
| SPANDRELFRITINSTANCESNOSCALE | This sub-property lists, for example, the instances that make up the fits used in the walltype (exterior). However, in a typical embodiment, these instances do not scale and only materials are applied to them. |

TABLE 3-continued

| PROPERTIES: GENERAL INFO/SETTINGS | |
| --- | --- |
| Property/Properties | Description |
| VCAPINSTANCES | This sub-property lists, for example, the instances that make up the exterior vertical caps used in the walltype (exterior). |
| VCAPINSTANCESNOSCALE | This sub-property lists, for example, the instances that make up the exterior vertical caps used in the walltype (exterior). However, in various embodiments, these instances do not scale and only materials are applied to them. |
| HCAPINSTANCES | This sub-property lists, for example, the instances that make up the exterior horizontal caps used in the walltype (exterior). |
| HCAPINSTANCESNOSCALE | This sub-property lists, for example, the instances that make up the exterior horizontal caps used in the walltype (exterior). However, in a typical embodiment, these instances do not scale and only materials will be applied to them. |
| SILICONEINSTANCES | This sub-property lists, for example, the instances that make up the silicone used in the walltype (exterior). |
| IGUS | This property defines, for example, the IGUs that are available to be applied to the walltypes. It can contain, for example, a JSON-formatted array of objects. Each object in the array can define, for example, a different IGU. Each IGU object can contain, for example, six properties. |
| ID | Unique numeric id |
| OB | String describing, for example, the glass used as the outer part of the IGU. |
| AS | String describing, for example, the glass used as the inner part of the IGU. |
| COLOR | A String used to generate, for example, a color chip for an IGU - Hex RBG format. |
| META | This sub-property can contain, for example, further sub-properties that are used to populate the tooltip for the IGU. In a typical embodiment, this sub-property can contain any desired text. In a typical embodiment, both the property names and values can appear in the tooltip. Sub-notes can include, for example, nominal thickness, visible transmittance, visible reflectance (out), visible reflectance (in), winter U-factor, and solar heat gain coefficient (SHGC). |
| DATA | In a typical embodiment, this property is used to define materials used in the IGU. |
| MATERIAL | Comma-separated list of materials that, in a typical embodiment, contains two materials. The first can be applied to the instances that make up the outer glass, and the second is applied to the instances that make up the inner glass. |
| PRODUCTS | This property defines, for example, the "products" that will be applied to mullions, horizontals, spandrels, hcaps, vcaps and silicone. The products can be defined as materials and can include, for example, four sub-properties. |
| ID | Unique numeric identifier. |
| NAME | String that describes, for example, the product. This can be the value, for example, that combo boxes display. |
| TYPE | String that tells, for example, which type of instance this is attached to (e.g., mullions, horizontals, spandrels, hcaps, vcaps or silicone). |
| DATA | Contains, for example, sub-properties that list which material is used to represent the product. |
| MATERIAL | String that lists the name of the material. |
| MATERIALGLASS | For some products (e.g., spandrels) a material for glass is included. In this case, the "material" material can be applied, for example, to the spandrel frit instance, and the "materialGlass" material can be applied to the spandrel instance. |
| CONFIGURATIONS | This property defines, for example, predefined "configurations" that are used to define aspects (e.g., all aspects) of a particular building's configuration (e.g., all walltypes, all IGUs and all products). |
| NAME | String containing the name of the Configuration. This string can be displayed in, for example, a "CONFIGURATIONS" dropdown in the application. |
| DESCRIPTION | String containing a brief description of the Configuration. |
| WALLTYPES | Contains an array of, for example, JSON objects describing each walltype. |
| ID | Numeric id of a walltype to which this refers. |
| IGUID | Numeric id of which IGU to use for this walltype. |
| FRAME | Sub-property that contains objects defining each part of a walltype frame, which products are attached to it, and any scaling that is to be applied. |
| Mullion | Includes, for example, product, width, and projection. |
| product | Id of the product that is applied to the frame part. |
| width | Scale factor of the instances' width. |
| projection | Scale factor of the instances' projection (depth). |

TABLE 3-continued

PROPERTIES: GENERAL INFO/SETTINGS

| Property/Properties | Description |
| --- | --- |
| Horizontal | Includes, for example, product, height, and projection. |
| product | Id of the product that is applied to the frame part. |
| height | Scale factor of the instances' height. |
| projection | Scale factor of the instances' projection (depth). |
| Spandrel | Includes, for example, product and projection. |
| product | Id of the product that is applied to the frame part. |
| projection | Scale factor of the instances' projection (depth). |
| Hcap | Includes, for example, product, height, and projection. |
| product | Id of the product that is applied to the frame part. |
| height | Scale factor of the instances' height. |
| projection | Scale factor of the instances' projection (depth). |
| Vcap | Includes, for example, product, width, and projection. |
| product | Id of the product that is applied to the frame part. |
| width | Scale factor of the instances' width. |
| projection | Scale factor of the instances' projection (depth). |
| Silicone | Includes, for example, product. |
| product | Id of the product that is applied to the frame part. |
| SAVE_IMAGE_RENDER_FRAMES | This property defines, for example, a number of frames to render when processing the "Create Images" function. In a typical embodiment, the more frames rendered, the higher the quality of the saved image. However, this typically needs to be balanced with the time each render will take. For example, in some embodiments, a value of 300 will do a good job of rendering an image that is sufficiently "resolved". |

What is claimed is:

1. A method of three-dimensional comparative visualization of a building comprising glass components, comprising, by a computer system:

causing a building model for a modeled building to be presented on a client computer, the building model comprising a three-dimensional scene of at least one of an interior and an exterior of the modeled building;

wherein the three-dimensional scene comprises an individual rendering of a photorealistic appearance of at least selected glass products for the modeled building in accordance with configured modeling properties, the three-dimensional scene comprising photorealistic views through the at least selected glass products;

wherein the configured modeling properties comprise a set of modeling properties for each glass product of a set of glass products, the set of glass products comprising the at least selected glass products and one or more alternative glass products distinct from the at least selected glass products, the set of modeling properties reflecting at least selected attributes of the glass product related to at least one of color, hue, brightness and transparency of the glass product;

wherein, for each glass product of the at least selected glass products, the set of modeling properties indicates:

how the glass product should photorealistically appear given the at least selected attributes of the glass products and one or more stored building-site attributes, wherein the one or more stored building-site attributes are related to at least one of sunlight direction and sunlight brightness at a geographic site of the modeled building and indicate an orientation of the modeled building relative to at least one sunlight obstruction; and how the photorealistic appearance of the glass product should differ in response to changes to a set of user-selectable modeling variables that vary at least one of weather, a time of day and a time of year;

receiving a user change to the three-dimensional scene via a graphical user interface (GUI) component, wherein the user change comprises an exchange of a particular glass product of the at least selected glass products for an alternative glass product of the one or more alternative glass products, wherein the at least one of color, hue, brightness and transparency of the alternative glass product is different from the at least one of color, hue, brightness and transparency of the particular glass product;

accessing the configured modeling properties responsive to the user change; and dynamically changing the building model in accordance with the user change, the dynamically changing comprising:

individually rendering a photorealistic appearance of the alternative glass product in place of the particular glass product in accordance with the set of modeling properties of the alternative glass product; and adjusting lighting in the three-dimensional scene based, at least in part, on the at least one of color, hue, brightness and transparency of the alternative glass product and the at least one of sunlight direction and sunlight brightness indicated in the building-site attributes, wherein the three-dimensional scene as adjusted includes a photorealistic view through the alternative glass product.

2. The method of claim 1, comprising permitting a user of the client computer to perform a virtual walkthrough of the three-dimensional scene.

3. The method of claim 1, wherein each glass product of the at least selected glass products is maintained as an object having the set of modeling properties for that glass product.

4. The method of claim 1, wherein the particular glass product and the alternative glass product each comprise a building-envelope component.

5. The method of claim 1, wherein the particular glass product and the alternative glass product each comprise a window.

6. The method of claim 5, comprising permitting a user to view the modeled building externally while looking through the window to an interior of the modeled building.

7. The method of claim 5, comprising permitting a user to view the modeled building internally while looking through the window to an exterior of the modeled building.

8. The method of claim 1, comprising dynamically changing at least one analytical model in accordance with the user change.

9. A system comprising:
a server computer comprising a processor and memory and operable to communicate with a client computer over a computer network;
a digital application resident on the server computer, the digital application comprising a product-visualization component operable to perform three-dimensional rendering;
wherein the server computer in combination with the digital application is operable to:
cause a building model for a modeled building to be presented on the client computer, the building model comprising a three-dimensional scene of at least one of an interior and an exterior of the modeled building;
wherein the three-dimensional scene comprises an individual rendering of a photorealistic appearance of at least selected glass products for the modeled building in accordance with configured modeling properties, the three-dimensional scene comprising photorealistic views through the at least selected glass products;
wherein the configured modeling properties comprise a set of modeling properties for each glass product of a set of glass products, the set of glass products comprising the at least selected glass products and one or more alternative glass products distinct from the at least selected glass products, the set of modeling properties reflecting at least selected attributes of the glass product related to at least one of color, hue, brightness and transparency of the glass product;
wherein, for each glass product of the at least selected glass products, the set of modeling properties indicates:
how the glass product should photorealistically appear given the at least selected attributes of the glass products and one or more stored building-site attributes, wherein the one or more stored building-site attributes are related to at least one of sunlight direction and sunlight brightness at a geographic site of the modeled building and indicate an orientation of the modeled building relative to at least one sunlight obstruction; and
how the photorealistic appearance of the glass product should differ in response to changes to a set of user-selectable modeling variables that vary at least one of weather, a time of day and a time of year;
receive a user change to the three-dimensional scene via a graphical user interface (GUI) component, wherein the user change comprises an exchange of a particular glass product of the at least selected glass products for an alternative glass product of the one or more alternative glass products, wherein the at least one of color, hue, brightness and transparency of the alternative glass product is different from the at least one of color, hue, brightness and transparency of the particular glass product;
access the configured modeling properties responsive to the user change; and
dynamically change the building model in accordance with the user change, the operability to dynamically change comprising operability to:
individually render a photorealistic appearance of the alternative glass product in place of the particular glass product in accordance with the set of modeling properties of the alternative glass product; and
adjust lighting in the three-dimensional scene based, at least in part, on the at least one of color, hue, brightness and transparency of the alternative glass product and the at least one of sunlight direction and sunlight brightness indicated in the building-site attributes, wherein the three-dimensional scene as adjusted includes a photorealistic view through the alternative glass product.

10. The system of claim 9, wherein the server computer is operable to permit a user of the client computer to perform a virtual walkthrough of the three-dimensional scene.

11. The system of claim 9, wherein the server computer is operable to:
maintain an object representation of each glass product of the at least selected glass products; and
store the configured modeling properties for each said object representation.

12. The system of claim 9, wherein the digital application comprises an analytical component operable to present modeling analytics.

13. The system of claim 12, wherein the server computer in combination with the digital application is operable to dynamically change at least one analytical model in accordance with the user change.

14. The system of claim 9, wherein the particular glass product comprises a building-envelope component.

15. A non-transitory computer-program product comprising a computer-usable medium having computer-readable program code embodied therein, the computer-readable program code adapted to be executed to implement a method comprising:
causing a building model for a modeled building to be presented on a client computer, the building model comprising a three-dimensional scene of at least one of an interior and an exterior of the modeled building;
wherein the three-dimensional scene comprises an individual rendering of a photorealistic appearance of at least selected glass products for the modeled building in accordance with configured modeling properties, the three-dimensional scene comprising photorealistic views through the at least selected glass products;
wherein the configured modeling properties comprise a set of modeling properties for each glass product of a set of glass products, the set of glass products comprising the at least selected glass products and one or more alternative glass products distinct from the at least selected glass products, the set of modeling properties reflecting at least selected attributes of the glass product related to at least one of color, hue, brightness and transparency of the glass product;
wherein, for each glass product of the at least selected glass products, the set of modeling properties indicates:
how the glass product should photorealistically appear given the at least selected attributes of the glass products and one or more stored building-site attributes, wherein the one or more stored building-site attributes are related to at least one of sunlight direction and sunlight brightness at a geographic site of the modeled building and indicate an orientation of the modeled building relative to at least one sunlight obstruction; and how the photorealistic appearance of the glass product should differ in response to changes to a set of user-selectable modeling variables that vary at least one of weather, a time of day and a time of year;

receiving a user change to the three-dimensional scene via a graphical user interface (GUI) component, wherein the user change comprises an exchange of a particular glass product of the at least selected glass products for an alternative glass product of the one or more alternative glass products, wherein the at least one of color, hue, brightness and transparency of the alternative glass product is different from the at least one of color, hue, brightness and transparency of the particular glass product;

accessing the configured modeling properties responsive to the user change; and dynamically changing the building model in accordance with the user change, the dynamically changing comprising:

individually rendering a photorealistic appearance of the alternative glass product in place of the particular glass product in accordance with the set of modeling properties of the alternative glass product; and adjusting lighting in the three-dimensional scene based, at least in part, on the at least one of color, hue, brightness and transparency of the alternative glass product and the at least one of sunlight direction and sunlight brightness indicated in the building-site attributes, wherein the three-dimensional scene as adjusted includes a photorealistic view through the alternative glass product.

16. The method of claim 15, wherein the non-transitory computer-program product is configured to allow the computer-readable program code to be executed on the client computer.

* * * * *